(12) United States Patent
Tsuno

(10) Patent No.: US 6,554,190 B1
(45) Date of Patent: Apr. 29, 2003

(54) BAR CODE READER AND ITS MISREADING DETECTING METHOD

(75) Inventor: Hajime Tsuno, Tokyo (JP)

(73) Assignee: NEC Infrontia Corporation, Kawasaki (JP)

( * ) Notice: Subject to any disclaimer, the term of this patent is extended or adjusted under 35 U.S.C. 154(b) by 166 days.

(21) Appl. No.: 09/717,317

(22) Filed: Nov. 22, 2000

(30) Foreign Application Priority Data

Nov. 24, 1999 (JP) .......................................... 11-333006

(51) Int. Cl.[7] .............................................. G06K 19/06
(52) U.S. Cl. ................................................. 235/462.25
(58) Field of Search ........................... 235/462, 462.25, 235/462.07, 462.05, 462.1

(56) References Cited

U.S. PATENT DOCUMENTS 6,042,011 A * 3/2000 Park et al. .............. 235/462.01
6,330,972 B1 * 12/2001 Wiklof et al. ........... 235/462.25
6,375,077 B1 * 4/2002 Hankins ................ 235/462.45

* cited by examiner

Primary Examiner—Karl D. Frech
Assistant Examiner—Lisa M. Caputo
(74) Attorney, Agent, or Firm—Whitham, Curtis & Christofferson, P.C.

(57) ABSTRACT

A bar code reader having a reading circuit for reading a bar code, an analyzing circuit for decoding the bar code read by the reading circuit into a numerical code, and a data transfer circuit for transferring the numerical code to a host device, comprises a misreading information table for registering a misreading code corresponding to a bar code which has been converted into a mistaken numerical code in the past and a correct code corresponding to the original correct numerical code of the same bar code, and a misreading detecting circuit for detecting a misreading code in accord with the numerical code decoded by the analyzing circuit, from the misreading codes registered in the misreading information table and supplying the detected result to the data transfer circuit.

15 Claims, 4 Drawing Sheets

BAR CODE READER AND ITS MISREADING DETECTING METHOD

BACKGROUNDS OF THE INVENTION

1. Field of the Invention

The present invention relates to a bar code reader for reading and analyzing a bar code and its misreading detecting method.

2. Description of the Related Art

Accuracy of a bar code reader reading a bar code much depends on the quality of a bar code to be read, the accuracy of an optical system in a bar code reader reading a bar code, and the performance of decoding processing of a bar code reader. In these days, the optical system and the decoding processing of a bar code reader has been progressed technically. There is such a technique, by way of example, that the same bar code is read out at three positions, thereby to correct a reading error by comparison of the read results. The technical progress of the optical system and the decoding processing of a bar code reader can decrease the frequency of misreading a bar code.

However, occurrence of misreading a bar code much depends on the quality of the bar code itself. Even if enhancing the performance of the optical system and the accuracy of the decoding processing in a bar code reader, this will not necessarily serve to decrease the frequency of misreading a bar code.

Since the quality of a bar code is affected by the accuracy of a recording device for recording a bar code on a storing medium and the material of a storing medium, the bar codes are of uneven quality, and it is difficult to maintain the quality of the bar codes at a predetermined level and the more.

In order to improve the quality of a bar code, it is necessary for a maker of bar codes to improve the accuracy of the recording device for recording a bar code on a storing medium and the material of a storing medium. Further, in order to improve the optical system and the decoding processing of a bar code reader, it is necessary for a maker of the bar code readers to improve the accuracy of the optical system and the performance of the decoding processing of a bar code reader. Therefore, it is difficult to modify the misreading of a bar code immediately during the operation.

As mentioned above, the conventional bar code reader is difficult to improve the quality of a bar code and modify the optical system and the decoding processing of a bar code reader at an actual site of using a bar code reader. Further, there is a problem that it takes much time for a maker of bar codes and bar code readers to improve the quality of a bar code and modify the optical system and the decoding processing of a bar code reader.

SUMMARY OF THE INVENTION

An object of the present invention is to provide a bar code reader capable of coping with misreading of a bar code easily and quickly even during the operation.

According to the first aspect of the invention, a bar code reader having reading means for reading out a bar code, analyzing means for decoding the bar code read by the reading means into a numerical code, and data transfer means for transferring the numerical code to a host device, comprises a misreading information table for registering a misreading code corresponding to a bar code having been converted into a mistaken numerical code in the past and a correct code corresponding to an original correct numerical code of the same bar code, and misreading detecting means for detecting the misreading code in accord with the numerical code decoded by the analyzing means, from the misreading codes registered in the misreading information table, and supplying the detected result to the data transfer means.

In the preferred construction, the bar code reader further comprises connecting means for connecting the misreading information table to the misreading detecting means in a removable way.

In another preferred construction, the misreading detecting means transfers to a registration mode when the numerical code decoded by the analyzing means is a predetermined code for transferring the means to the registration mode for registering the misreading code and the correct code into the misreading information table.

In another preferred construction, the bar code reader further comprises connecting means for connecting the misreading information table to the misreading detecting means in a removable way, wherein the misreading detecting means transfers to a registration mode when the numerical code decoded by the analyzing means is a predetermined code for transferring the means to the registration mode for registering the misreading code and the correct code into the misreading information table.

In another preferred construction, the misreading detecting means transfers to a registration mode when the numerical code decoded by the analyzing means is a predetermined code for transferring the means to the registration mode for registering the misreading code and the correct code into the misreading information table, and registers the numerical code decoded by the analyzing means into the misreading information table as the misreading code after transition to the registration mode.

In another preferred construction, the bar code reader further comprises connecting means for connecting the misreading information table to the misreading detecting means in a removable way, in which the misreading detecting means transfers to a registration mode when the numerical code decoded by the analyzing means is a predetermined code for transferring the means to the registration mode for registering the misreading code and the correct code into the misreading information table, and registers the numerical code decoded by the analyzing means into the misreading information table as the misreading code after transition to the registration mode.

In another preferred construction, the misreading detecting means transfers to a registration mode when the numerical code decoded by the analyzing means is a predetermined code for transferring the means to the registration mode for registering the misreading code and the correct code into the misreading information table, and the misreading detecting means includes a counter for subtracting one from a counter value every time of receiving the numerical code decoded by the analyzing means, combines together the numerical codes decoded by the analyzing means in the order of receiving until the counter value becomes 0 since the counter value of the counter is set, and registers the combined numerical codes into the misreading information table as the correct code.

In another preferred construction, the bar code reader further comprises connecting means for connecting the misreading information table to the misreading detecting means in a removable way, in which the misreading detecting means transfers to a registration mode when the numerical code decoded by the analyzing means is a predetermined code for transferring the means to the registration mode for registering the misreading code and the correct code into the misreading information table, and the misreading detecting means includes a counter for subtracting one from a counter value every time of receiving the numerical code decoded by the analyzing means, combines together the numerical codes decoded by the analyzing means in the order of receiving until the counter value becomes 0 since the counter value of the counter is set, and registers the combined numerical codes into the misreading information table as the correct code.

In another preferred construction, the misreading detecting means transfers to a registration mode when the numerical code decoded by the analyzing means is a predetermined code for transferring the means to the registration mode for registering the misreading code and the correct code into the misreading information table, registers the numerical code decoded by the analyzing means into the misreading information table as the misreading code after transition to the registration mode, includes a counter for subtracting one from a counter value every time of receiving the numerical code decoded by the analyzing means, combines together the numerical codes decoded by the analyzing means in the order of receiving until the counter value becomes 0 since the counter value of the counter is set, and registers the combined numerical codes into the misreading information table as the correct code.

In another preferred construction, the bar code reader further comprises connecting means for connecting the misreading information table to the misreading detecting means in a removable way, in which the misreading detecting means transfers to a registration mode when the numerical code decoded by the analyzing means is a predetermined code for transferring the means to the registration mode for registering the misreading code and the correct code into the misreading information table, registers the numerical code decoded by the analyzing means into the misreading information table as the misreading code after transition to the registration mode, includes a counter for subtracting one from a counter value every time of receiving the numerical code decoded by the analyzing means, combines together the numerical codes decoded by the analyzing means in the order of receiving until the counter value becomes 0 since the counter value of the counter is set, and registers the combined numerical codes into the misreading information table as the correct code.

In another preferred construction, the misreading detecting means notifies occurrence of bar code misreading to the host device when detecting the misreading code in accord with the numerical code decoded by the analyzing means.

In another preferred construction, the bar code reader further comprises connecting means for connecting the misreading information table to the misreading detecting means in a removable way, in which the misreading detecting means notifies occurrence of bar code misreading to the host device when detecting the misreading code in accord with the numerical code decoded by the analyzing means.

In another preferred construction, the misreading detecting means transfers to a registration mode when the numerical code decoded by the analyzing means is a predetermined code for transferring the means to the registration mode for registering the misreading code and the correct code into the misreading information table, and notifies occurrence of bar code misreading to the host device when detecting the misreading code in accord with the numerical code decoded by the analyzing means.

In another preferred construction, the misreading detecting means notifies occurrence of bar code misreading to the host device when detecting the misreading code in accord with the numerical code decoded by the analyzing means, and selects one of transfer methods of transferring only the correct code, transferring only the misreading code, and transferring both the correct code and the misreading code, as the transfer method of the detected result to be transferred to the host device by the data transfer means.

In another preferred construction, the misreading detecting means notifies occurrence of bar code misreading to the host device when detecting.the misreading code in accord with the numerical code decoded by the analyzing means, selects one of transfer methods of transferring only the correct code, transferring only the misreading code, and transferring both the correct code and the misreading code, as the transfer method of the detected result to be transferred to the host device by the data transfer means, and changes setting of the transfer method of the detected result to be supplied to the data transfer means, based on the content of a predetermined code for specifying the transfer method, when the numerical code decoded by the analyzing means is the predetermined code for specifying the transfer method.

According to the second aspect of the invention, a misreading detecting method for detecting misreading by a reading means in a bar code reader having the reading means for reading out a bar code, analyzing means for decoding the bar code read by the reading means into a numerical code, and data transfer means for transferring the numerical code to a host device, the method comprising the steps of a step of registering a misreading code corresponding to a bar code having been converted into a mistaken numerical code in the past and a correct code corresponding to an original correct numerical code of the same bar code, into the misreading information table in advance, and a step of detecting bar code misreading by retrieving the misreading code in accord with the numerical code decoded by the analyzing means.

In the preferred construction, the misreading detecting method comprises a step of transferring to a registration mode when the numerical code decoded by the analyzing means is a predetermined code for turning to the registration mode for registering the misreading code and the correct code into the misreading information table.

In another preferred construction, the misreading detecting method comprises a step of transferring to a registration mode when the numerical code decoded by the analyzing means is a predetermined code for turning to the registration mode for registering the misreading code and the correct code into the misreading information table, and a step of registering the numerical code decoded by the analyzing means into the misreading information table as the misreading code after transition to the registration mode.

In another preferred construction, the misreading detecting method comprises a step of transferring to a registration mode when the numerical code decoded by the analyzing means is a predetermined code for turning to the registration mode for registering the misreading code and the correct code into the misreading information table, and a step of combining together the numerical codes decoded by the analyzing means in the order of receiving until counter value becomes 0 since the counter value of a counter is set, the counter subtracting one from the counter value every time of receiving the numerical codes decoded by the analyzing means, and registering the combined numerical codes into the misreading information table as the correct code.

In another preferred construction, the misreading detecting method further comprises a step of setting the number of digits of numerical information in the vicinity of a misread bar code in the counter, making the reading means sequentially read out every numerical value of each digit of the numerical information, using a bar code indicating the numerical value of one digit from 0 to 9, combining together the read numerical codes in the order of reading out until the value of the counter becomes 0, and registering the combined numerical codes into the misreading information table as the correct code.

In another preferred construction, the misreading detecting method comprises a step of transferring to a registration mode when the numerical code decoded by the analyzing means is a predetermined code for turning to the registration mode for registering the misreading code and the correct code into the misreading information table, a step of registering the numerical code decoded by the analyzing means into the misreading information table as the misreading code after transition to the registration mode, and a step of combining together the numerical codes decoded by the analyzing means in the order of receiving until counter value becomes 0 since the counter value of a counter is set, the counter subtracting one from the counter value every time of receiving the numerical codes decoded by the analyzing means, and registering the combined numerical codes into the misreading information table as the correct code.

In another preferred construction, the misreading detecting method comprises a step of notifying occurrence of bar code misreading to the host device when detecting the misreading code in accord with the numerical code decoded by the analyzing means.

In another preferred construction, the misreading detecting method comprises a step of notifying occurrence of misreading a bar code to the host device when detecting the misreading code in accord with the numerical code decoded by the analyzing means, and a step of selecting one of transfer methods of transferring only the correct code, transferring only the misreading code, and transferring both the correct code and the misreading code, as the transfer method of the detected result to be transferred to the host device by the data transfer means.

In another preferred construction, the misreading detecting method comprises a step of notifying occurrence of bar code misreading to the host device when detecting the misreading code in accord with the numerical code decoded by the analyzing means, a step of selecting one of transfer methods of transferring only the correct code, transferring only the misreading code, and transferring both the correct code and the misreading code, as the transfer method of the detected result to be transferred to the host device by the data transfer means, and a step of changing setting of the transfer method of the detected result to be supplied to the data transfer means, based on the content of a predetermined code for specifying the transfer method, when the numerical code decoded by the analyzing means is the predetermined code for specifying the transfer method.

According to another aspect of the invention, a computer readable memory storing a misreading detecting program for detecting misreading by reading means in a bar code reader having the reading means for reading out a bar code, analyzing means for decoding the bar code read by the reading means into a numerical code, and data transfer means for transferring the numerical code to a host device, the misreading detecting program comprising
a step of registering a misreading code corresponding to a bar code having been converted into a mistaken numerical code in the past and a correct code corresponding to an original correct numerical code of the same bar code, into the misreading information table in advance, and
a step of detecting bar code misreading by retrieving the misreading code in accord with the numerical code decoded by the analyzing means.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not taken to be limitative to the invention, but are for explanation and understanding only.

In the drawings.

DESCRIPTION OF THE PREFERRED EMBODIMENT

Figure 1:
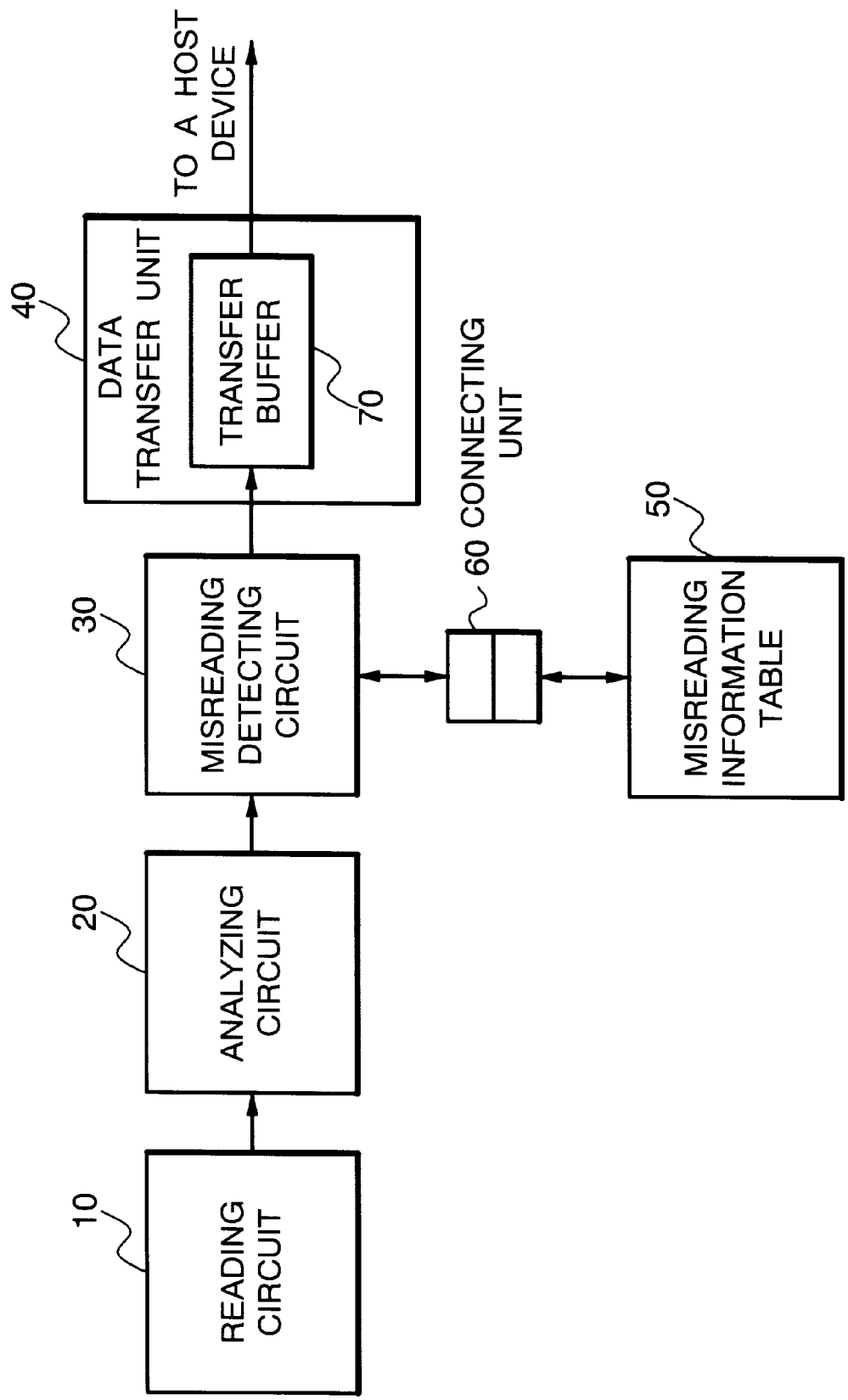
FIG. 1 is a block diagram showing the structure of a bar code reader according to one embodiment of the present invention.

A bar code reader according to an embodiment of the present invention will be described in detail with reference to the drawings. In all the drawings, the same reference numerals are attached to the same components.

FIG. 1 is a block diagram showing the structure of the bar code reader of the embodiment. As illustrated in FIG. 1, the bar code reader of the embodiment comprises a reading circuit 10, an analyzing circuit 20, a misreading detecting circuit 30, a data transfer unit 40, a misreading information table 50, and a connecting unit 60. The misreading detecting circuit 30 is electrically connected to the misreading information table 50 through the removable connecting unit 60. The data transfer unit 40 includes a transfer buffer 70. As the connecting unit 60, a connector having an electric contact, an optical connector of infrared ray, and the like can be used.

A bar code read out by the reading circuit 10 is decoded by the analyzing circuit 20 and converted into a numerical code. The numerical code decoded by the analyzing circuit 20 is supplied to the misreading detecting circuit 30. The misreading information table 50 stores misreading codes having been misread in the past and the originally correct codes corresponding to them. The misreading detecting circuit 30 checks whether any misreading code corresponding to the input numerical code is stored in the misreading information table 50 or not: when there is no corresponding misreading code, the input numerical code is stored in the transfer buffer 70 included in the data transfer unit 40; while when there is a corresponding misreading code, the correct code and/or the misreading code corresponding to the result is stored in the transfer buffer 70. The data transfer unit 40 transfers such codes to be stored in the transfer buffer 70, to a host device.

Figure 2:
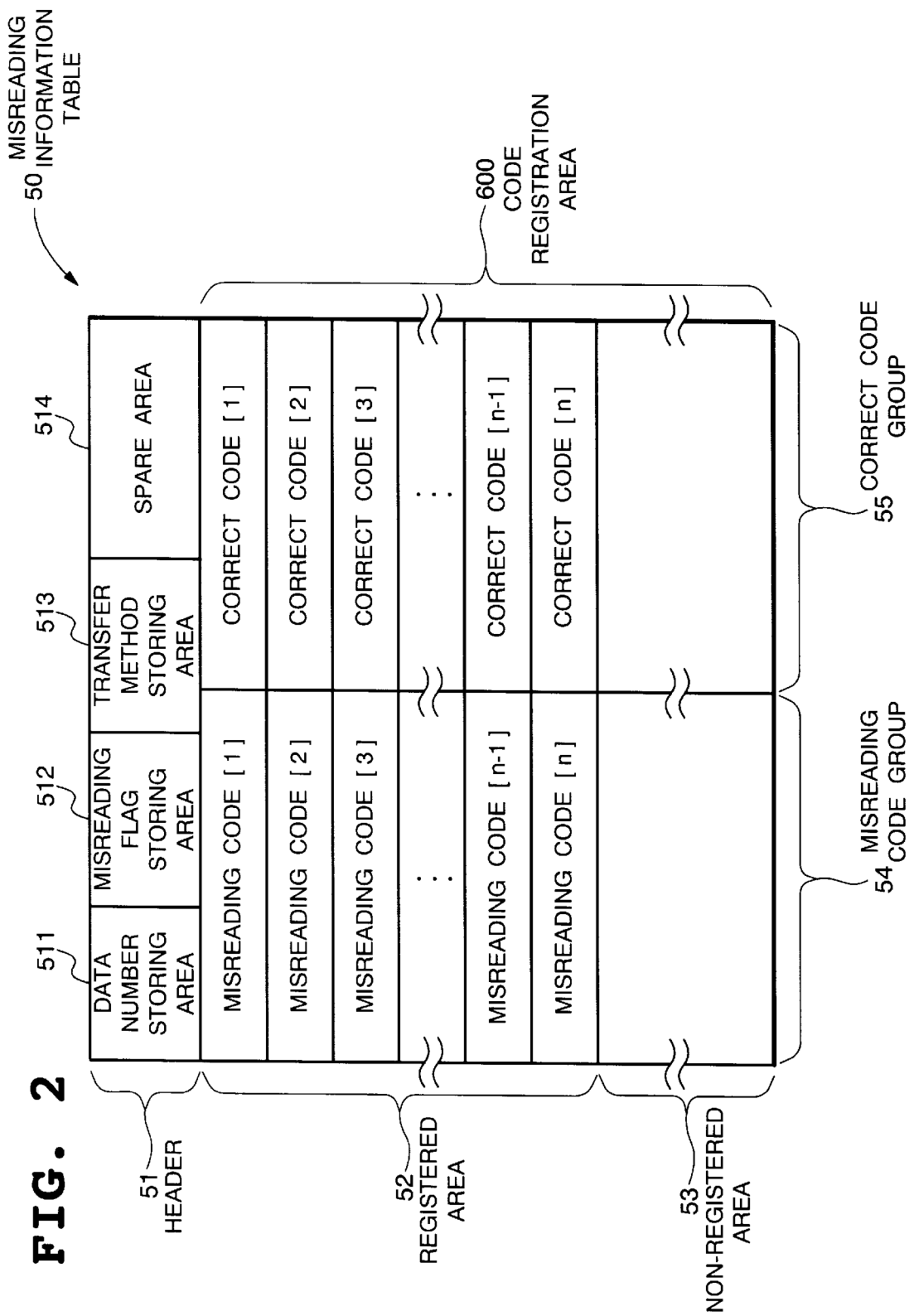
FIG. 2 is a block diagram showing the file structure of a misreading information table of the bar code reader according to one embodiment of the present invention.

FIG. 2 is a view of a table showing the structure of the misreading information table 50. As illustrated in FIG. 2, the misreading information table 50 consists of a header 51 and a code registration area 600. The header 51 consists of a data number storing area 511 for storing the number of data registered in the misreading information table 50, a misreading flag storing area 512 for storing a misreading flag for notifying the occurrence of misreading to the host device, a transfer method storing area 513 for storing the transfer method specifying the numerical code to be stored in the transfer buffer 70 when a misreading code corresponding to the numerical code decoded by the analyzing circuit 20 is searched, and a spare area 514 of the remaining area.

The code registration area 600 consists of a registered area 52 where misreading codes and correct codes are previously registered and a non-registered area 53 where any misreading code and correct code is not registered yet. Each pair of a misreading code and the correct code corresponding to it is registered in the code registration area 600, each index value i is attached to each pair of codes in the order of registration. The number n of misreading codes and correct codes are registered in the misreading information table 50 of FIG. 2. A group of n misreading codes is defined as a misreading code group 54 and a group of n correct codes is defined as a correct code group 55.

The misreading detecting circuit 30 is provided with an ordinary mode for searching for a misreading code, a registration mode for registering a misreading code and the correct code in the non-registered area 53 of the misreading information table 50, and a transfer method setting mode for setting the transfer method in the transfer method storing area 513.

In the ordinary mode, as mentioned above, the misreading detecting circuit 30 checks whether a misreading code corresponding to the numerical code decoded by the analyzing circuit 20 exists within the misreading information table 50, and when there is a misreading code corresponding to it, the circuit 30 operates to store the correct code and/or the misreading code as the check result into the transfer buffer 70, according to the transfer method stored in the transfer method storing area 513. The format 1, the format 2, or the format 3 is stored in the transfer method storing area 513. When the format 1 is stored in the transfer method storing area 513, the misreading detecting circuit 30 stores both the misreading code and the correct code into the transfer buffer 70. When the format 2 is stored in the transfer method storing area 513, the misreading detecting circuit 30 stores only the correct code into the transfer buffer 70. When the format 3 is stored in the transfer method storing area 513, the misreading detecting circuit 30 stores only the misreading code into the transfer buffer 70.

When detecting a misreading code corresponding to the numerical code decoded by the analyzing circuit 20, the misreading detecting circuit 30 turns on a misreading flag to be stored in the misreading flag storing area 512 of the misreading information table 50 and stores the misreading flag into the transfer buffer 70. This storing the misreading flag into the transfer buffer 70 notifies the occurrence of misreading to the host device.

The misreading detecting circuit 30 is transferred from the ordinary mode to the registration mode by the reading circuit 10 reading out a bar code that is a control code for transferring the circuit 30 to the registration mode. When the misreading detecting circuit 30 is transferred to the registration mode, a bar code having the code pattern for a misreading code is prepared, the code is read out by the reading circuit 10, and being decoded by the analyzing circuit 20, it is added to the non-registered area 53 of the misreading information table 50, thereby registering the misreading code.

When registering a correct code, since a correct numerical code cannot be obtained even if a bar code misread by the reading circuit 10 is read out as it is, registration is performed in the different method from the above-mentioned registration method of the misreading code. First, an operator visually confirms the numerical information of the bar code misread. Further, the operator prepares the bar codes showing numerals of one digit 0 to 9, and makes the reading circuit 10 read out the numerals of the numerical information of the bar code which has been visually confirmed, by one digit in turn from the top. The misreading detecting circuit 30 puts together the numerical codes of one digit read out in turn so to form a numerical code, and stores the put numerical code into the misreading information table 50 as the correct code. Since the correct code is stored in the above-mentioned method, the misreading detecting circuit 30 is provided with a counter for setting the number of the digit of the correct code (not illustrated).

Further, the misreading detecting circuit 30 is transferred from the ordinary mode to the transfer method setting mode, by the reading circuit 10 reading out a bar code that is a control code specifying the transfer method.

When the misreading detecting circuit 30 is transferred to the transfer method setting mode, the misreading detecting circuit 30 stores one of the formats 1 to 3 specified by the control code, into the transfer method storing area 513 of the misreading information table 50.

Figure 3:
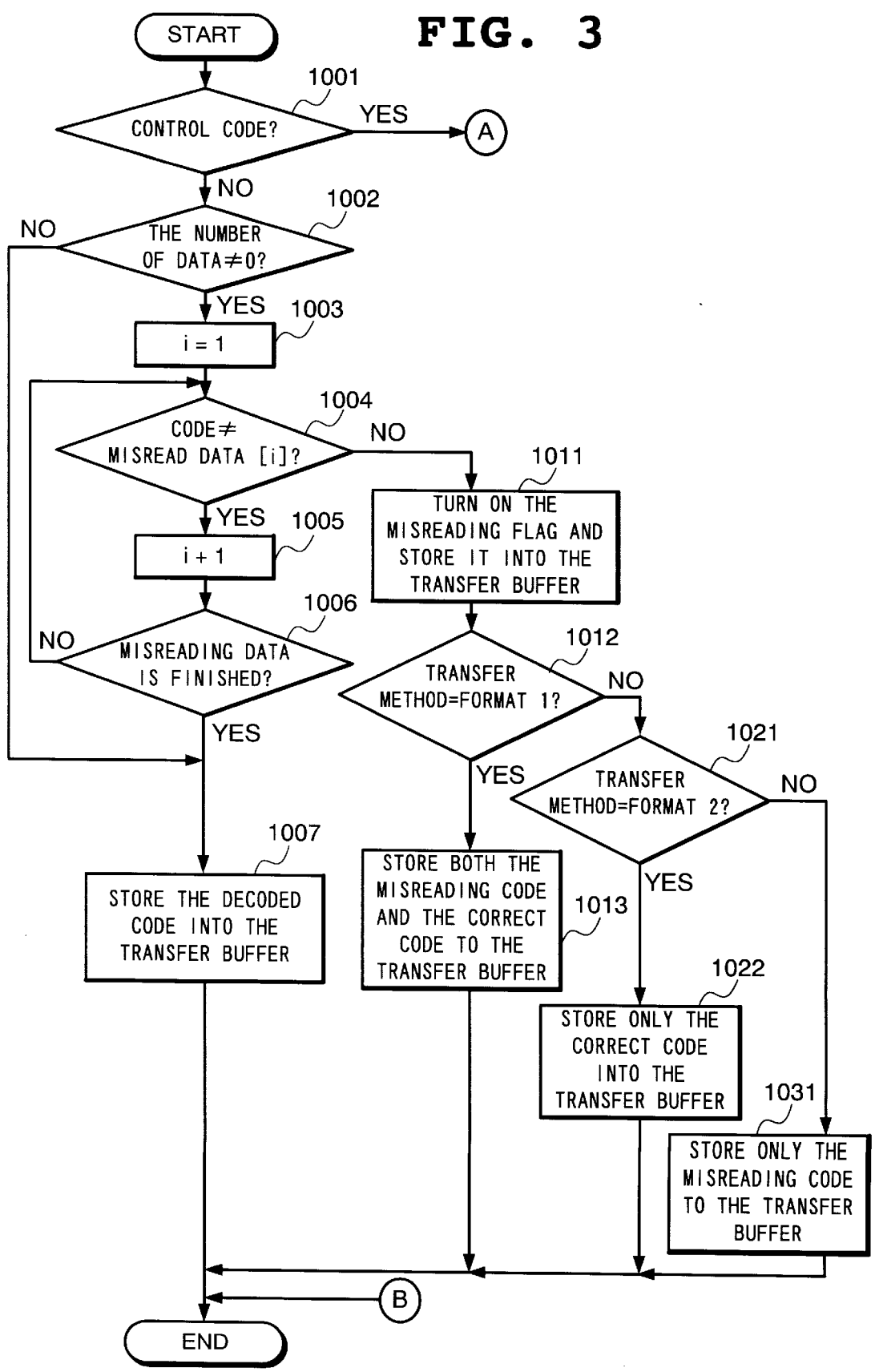
FIG. 3 is a flow chart showing the operation in an ordinary mode of a misreading detecting circuit in the bar code reader according to one embodiment of the present invention.
Figure 4:
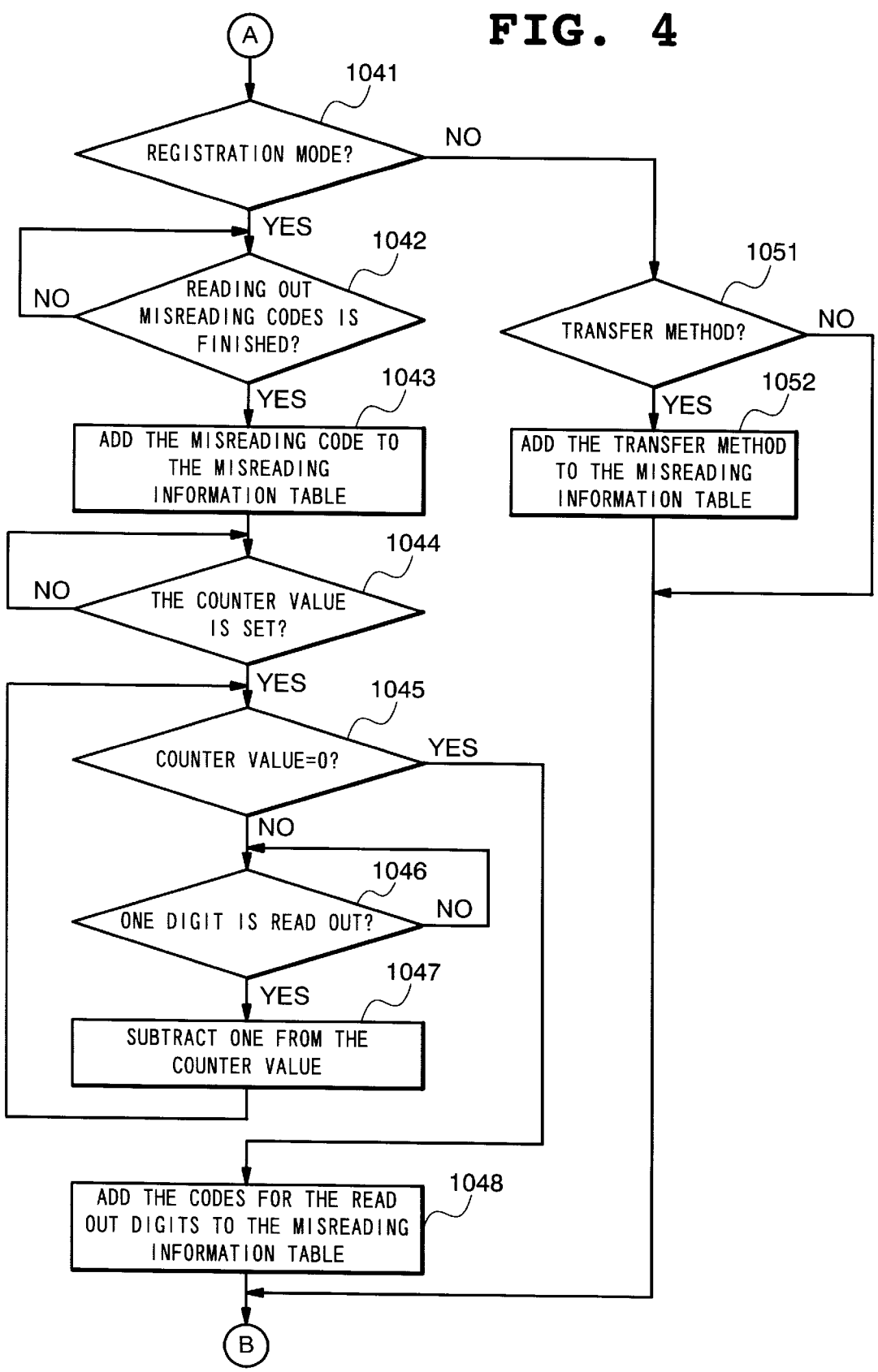
FIG. 4 is a flow chart showing the operation in a registration mode and a transfer method setting mode of the misreading detecting circuit in the bar code reader according to one embodiment of the present invention.

This time, the operation of the bar code reader according to the embodiment will be described with reference to FIG. 3 and FIG. 4. FIG. 3 is a flow chart showing the operation in the ordinary mode of the misreading detecting circuit 30 in the bar code reader according to the embodiment. As illustrated in FIG. 3, when the misreading detecting circuit 30 receives the numerical code decoded by the analyzing circuit 20, first it checks whether the numerical code is a control code or not (Step 1001). When the decoded numerical code is not a control code, the misreading detecting circuit 30 checks whether the number of data stored in the data number storing area 511 within the header 51 of the misreading information table 50 is zero or not (Step 1002). When the number of the data is zero, since it means that there is no misreading code registered in the misreading information table 50, the decoded numerical code is stored into the transfer buffer 70 (Step 1007), hence to finish the processing.

When the number of the data stored in the data number storing area 511 is not zero, the misreading detecting circuit 30 regards the index value i of a misreading code as 1 (Step 1003). Consequently, the misreading detecting circuit 30 compares the misreading code of the index value i with the decoded numerical code (Step 1004), and when the misreading code is not in accord with the decoded numerical code, the index value i is incremented (Step 1005). When there is a misreading code corresponding to the incremented index value i, the misreading detecting circuit 30 returns to Step 1004. Where there is no misreading code corresponding to the index value i, the misreading detecting circuit 30 stores the decoded numerical code into the transfer buffer 70 as it is as no error code (Step 1007) and finishes the processing.

In Step 1004, when the decoded numerical code and the misreading code are in one accord, the misreading detecting circuit 30 turns on a misreading flag stored in the misreading flag storing area 512 and stores the misreading flag into the transfer buffer 70 (Step 1011). The misreading detecting circuit 30 checks whether the transfer method stored in the transfer method storing area 513 is the format 1 or not (Step 1012), and when the transfer method is the format 1, the misreading detecting circuit 30 stores the misreading code corresponding to the decoded numerical code and the correct code corresponding to the same misreading code into the transfer buffer 70 (Step 1013). In Step 1012, when the transfer method is not the format 1, the misreading detecting circuit 30 checks whether the transfer method is the format 2 or not (Step 1021), and when the transfer method is the format 2, it stores only the correct code into the transfer buffer 70 (Step 1022). In Step 1021, when the transfer method is not the format 2, since the transfer method is the format 3, the misreading detecting circuit 30 stores only the misreading code into the transfer buffer 70 (Step 1031) and finishes the processing.

The operation in the case where the misreading detecting circuit 30 is transferred to the registration mode and the transfer method setting mode will be described this time. FIG. 4 is a flow chart showing the operation in the registration mode and the transfer method setting mode of the misreading detecting circuit 30 in the bar code reader of this embodiment. As illustrated in FIG. 3, when the code decoded in Step 1001 is a control code, the operation moves to A of FIG. 4. Thereafter, the misreading detecting circuit 30 checks whether the control code is a control code for specifying the transition to the registration mode or not (Step 1041). When the control code is to specify the transition to the registration mode, the misreading detecting circuit 30 waits until the reading circuit 10 reads out a bar code having the code pattern of a misreading code (Step 1042). When the reading circuit 10 reads out the bar code having the code pattern of a misreading code, the misreading detecting circuit 30 adds the read out misreading code to the misreading information table 3 (Step 1043).

This time, an operator visually confirms the numerical information in the vicinity of a bar code misread and sets the digit of the bar code for a counter of the misreading detecting circuit 30. The misreading detecting circuit 30 waits until the counter value of the counter is set (Step 1044). Before the counter value becomes 0 (Step 1045), the misreading detecting circuit 30 waits until the reading circuit 10 reads out a bar code (Step 1046) and decreases the counter value every time of reading out every one digit (Step 1047). In Step 1045, when the counter value becomes 0, the misreading detecting circuit 30 aligns and puts together the numerical values of one digit received so far, in the order of receiving and adds the same numerical code to the misreading information table 50 as the correct code (Step 1048).

In Step 1041, when the decoded numerical code is not a control code for specifying the transition to the registration mode, the misreading detecting circuit 30 confirms whether the decoded numerical code is the numerical code for specifying the transfer method or not (Step 1051), when the decoded numerical code is the control code for specifying the transfer method, it stores the transfer method specified by the decoded numerical code, into the transfer method storing area 513 of the misreading information table 50 (Step 1052), and finishes the processing. In Step 1051, when the decoded numerical code is not the control code for specifying the transfer method, the misreading detecting circuit 30 finishes the processing as it is.

In Step 1044, though the number of digit of the numerical bar code is set in the counter provided in the misreading detecting circuit 30, a bar code indicating this counter value is prepared and the counter value may be set in the counter by the reading circuit 10 reading out the bar code.

Provided with the misreading information table 50 capable of registering the correct code and the misreading code having been generated in the past therein and the misreading detecting circuit 30 for searching for a misreading code corresponding to the decoded numerical code based on the misreading code registered in the misreading information table 50, the bar code reader of the embodiment can detect misreading of a bar code based on the misreading information table 50 for registering a misreading code generated at an actual site, thereby to cope with the misreading of a bar code easily and immediately.

Provided with the misreading information table 50 removably from the connecting unit 60, the bar code reader of the embodiment can install the misreading information table 50 also in another bar code reader, thereby to make a wide use of the information on the misreading codes and the correct codes stored in the misreading information table 50.

Since the bar code reader of the embodiment reads out a bar code in order to transfer the mode to the registration mode and the transfer method setting mode, register a misreading code and a correct code, and set a transfer method, it is not necessary to provide with any special input means for these processing.

Since the bar code reader of the embodiment reads out a predetermined bar code in order to transfer the mode to the registration mode, it can create a state for registering a misreading code into the misreading information table without any special input means, thereby making easy the structure of the bar code reader.

Since the bar code reader of the embodiment registers a misreading code into the misreading information table, using misreading detecting means, by reading out a bar code having the code pattern of the misreading code, when registering the misreading code into the misreading information table, it is not necessary to separately provide with input means for registering a misreading code into the misreading information table, thereby making easy the structure of the bar code reader.

According to the bar code reader of the embodiment, since the misreading detecting means notifies the occurrence of misreading to a host device, the host device can recognize the occurrence of the misreading and judge whether the transferred code is right or not.

Since the bar code reader of the embodiment reads out a predetermined bar code in order to change the setting of the transfer method of the retrieval result, it is not necessary to provide with any special input means for setting the transfer method of the retrieval result, thereby making easy the structure of the bar code reader.

Since the bar code reader of the embodiment reads out every one digit of the numerical values of a bar code, when reading out a correct code, it is possible to surely read out the numerical values of the bar code, thereby registering the correct code into the misreading information table 50 accurately.

According to the bar code reader of the embodiment, since the misreading detecting circuit 30 notifies the occurrence of misreading to a host device, the host device can recognize the occurrence of the misreading and the host device can judge whether the numerical code transferred from the transfer buffer 70 is correct or not.

The bar code reader of the embodiment can select the transfer method for transferring the retrieval result to the host device, thereby to cope with various transfer methods and further cope with various specification of an interface of the host device.

Needless to say, the misreading detecting function of the bar code reader according to the embodiment can be realized by hardware, and it can be realized also by loading a computer program (misreading detecting program) having each function into a memory of a computer. This misreading detecting program is stored in a storing medium such as a magnetic disk, a semiconductor memory, or the like. Then, it is loaded into a computer from the storing medium, so to control the operation of the computer, thereby realizing the above mentioned respective functions.

As set forth hereinabove, provided with the misreading information table capable of registering correct codes and misreading codes having been generated in the past and the misreading detecting circuit for detecting a misreading code based on the misreading code registered in the same misreading information table, the bar code reader of the present invention can register a misreading code generated at an actual site into the misreading information table and detect misreading of a bar code based on the misreading code registered in the misreading information table, thereby coping with misreading of a bar code easily and quickly.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A bar code reader having reading means for reading out a bar code, analyzing means for decoding the bar code read by the reading means into a numerical code, and data transfer means for transferring the numerical code to a host device, comprising:
    a misreading information table for registering a misreading code corresponding to a bar code having been converted into a mistaken numerical code in the past and a correct code corresponding to an original correct numerical code of the same bar code; and
    misreading detecting means for detecting the misreading code in accord with the numerical code decoded by the analyzing means, from the misreading codes registered in said misreading information table, and supplying the detected result to the data transfer means.

2. A bar code reader as set forth in claim 1, further comprising
    connecting means for connecting said misreading information table to said misreading detecting means in a removable way.

3. A bar code reader as claimed in claim 1, in which
    said misreading detecting means
        transfers to a registration mode when the numerical code decoded by the analyzing means is a predetermined code for transferring said means to the registration mode for registering the misreading code and the correct code into said misreading information table.

4. A bar code reader as set forth in claim 1, further comprising
    connecting means for connecting said misreading information table to said misreading detecting means in a removable way, wherein
    said misreading detecting means
        transfers to a registration mode when the numerical code decoded by the analyzing means is a predetermined code for transferring said means to the registration mode for registering the misreading code and the correct code into said misreading information table.

5. A bar code reader as set forth in claim 1, in which
    said misreading detecting means
        transfers to a registration mode when the numerical code decoded by the analyzing means is a predetermined code for transferring said means to the registration mode for registering the misreading code and the correct code into said misreading information table, and
        registers the numerical code decoded by the analyzing means into said misreading information table as the misreading code after transition to the registration mode.

6. A bar code reader as set forth in claim 1, further comprising
    connecting means for connecting said misreading information table to said misreading detecting means in a removable way, in which
    said misreading detecting means
        transfers to a registration mode when the numerical code decoded by the analyzing means is a predetermined code for transferring said means to the registration mode for registering the misreading code and the correct code into said misreading information table, and
        registers the numerical code decoded by the analyzing means into said misreading information table as the misreading code after transition to the registration mode.

7. A bar code reader as set forth in claim 1, in which
    said misreading detecting means
        transfers to a registration mode when the numerical code decoded by the analyzing means is a predetermined code for transferring said means to the registration mode for registering the misreading code and the correct code into said misreading information table, and
    said misreading detecting means
        includes a counter for subtracting one from a counter value every time of receiving the numerical code decoded by the analyzing means, combines together the numerical codes decoded by the analyzing means in the order of receiving until the counter value becomes 0 since the counter value of the counter is set, and registers the combined numerical codes into said misreading information table as the correct code.

8. A bar code reader as set forth in claim 1, further comprising
    connecting means for connecting said misreading information table to said misreading detecting means in a removable way, in which said misreading detecting means
transfers to a registration mode when the numerical code decoded by the analyzing means is a predetermined code for transferring said means to the registration mode for registering the misreading code and the correct code into said misreading information table, and said misreading detecting means
includes a counter for subtracting one from a counter value every time of receiving the numerical code decoded by the analyzing means, combines together the numerical codes decoded by the analyzing means in the order of receiving until the counter value becomes 0 since the counter value of the counter is set, and registers the combined numerical codes into said misreading information table as the correct code.

9. A bar code reader as set forth in claim 1, in which said misreading detecting means
transfers to a registration mode when the numerical code decoded by the analyzing means is a predetermined code for transferring said means to the registration mode for registering the misreading code and the correct code into said misreading information table,
registers the numerical code decoded by the analyzing means into said misreading information table as the misreading code after transition to the registration mode,
includes a counter for subtracting one from a counter value every time of receiving the numerical code decoded by the analyzing means, combines together the numerical codes decoded by the analyzing means in the order of receiving until the counter value becomes 0 since the counter value of the counter is set, and registers the combined numerical codes into said misreading information table as the correct code.

10. A bar code reader as set forth in claim 1, further comprising
connecting means for connecting said misreading information table to said misreading detecting means in a removable way, in which
said misreading detecting means
transfers to a registration mode when the numerical code decoded by the analyzing means is a predetermined code for transferring said means to the registration mode for registering the misreading code and the correct code into said misreading information table,
registers the numerical code decoded by the analyzing means into said misreading information table as the misreading code after transition to the registration mode,
includes a counter for subtracting one from a counter value every time of receiving the numerical code decoded by the analyzing means, combines together the numerical codes decoded by the analyzing means in the order of receiving until the counter value becomes 0 since the counter value of the counter is set, and registers the combined numerical codes into said misreading information table as the correct code.

11. A bar code reader as set forth in claim 1, in which said misreading detecting means
notifies occurrence of bar code misreading to the host device when detecting the misreading code in accord with the numerical code decoded by the analyzing means.

12. A bar code reader as set forth in claim 1, further comprising
connecting means for connecting said misreading information table to said misreading detecting means in a removable way, in which
said misreading detecting means
notifies occurrence of bar code misreading to the host device when detecting the misreading code in accord with the numerical code decoded by the analyzing means.

13. A bar code reader as set forth in claim 1, in which said misreading detecting means
transfers to a registration mode when the numerical code decoded by the analyzing means is a predetermined code for transferring said means to the registration mode for registering the misreading code and the correct code into said misreading information table, and
notifies occurrence of bar code misreading to the host device when detecting the misreading code in accord with the numerical code decoded by the analyzing means.

14. A bar code reader as set forth in claim 1, in which said misreading detecting means
notifies occurrence of bar code misreading to the host device when detecting the misreading code in accord with the numerical code decoded by the analyzing means, and
selects one of transfer methods of transferring only the correct code, transferring only the misreading code, and transferring both the correct code and the misreading code, as the transfer method of the detected result to be transferred to the host device by the data transfer means.

15. A bar code reader as set forth in claim 1, in which said misreading detecting means
notifies occurrence of bar code misreading to the host device when detecting the misreading code in accord with the numerical code decoded by the analyzing means,
selects one of transfer methods of transferring only the correct code, transferring only the misreading code, and transferring both the correct code and the misreading code, as the transfer method of the detected result to be transferred to the host device by the data transfer means, and
changes setting of the transfer method of the detected result to be supplied to the data transfer means, based on the content of a predetermined code for specifying the transfer method, when the numerical code decoded by the analyzing means is the predetermined code for specifying the transfer method.

* * * * *